United States Patent
Brown et al.

(10) Patent No.: US 11,589,552 B2
(45) Date of Patent: Feb. 28, 2023

(54) PET CONTAINMENT APPARATUS

(71) Applicants: Jeffrey Paul Brown, Edmond, OK (US); Desiree Michelle Brown, Edmond, OK (US)

(72) Inventors: Jeffrey Paul Brown, Edmond, OK (US); Desiree Michelle Brown, Edmond, OK (US)

( * ) Notice: Subject to any disclaimer, the term of this patent is extended or adjusted under 35 U.S.C. 154(b) by 212 days.

(21) Appl. No.: 16/886,440

(22) Filed: May 28, 2020

(65) Prior Publication Data
US 2021/0368733 A1 Dec. 2, 2021

(51) Int. Cl.
*A01K 1/02* (2006.01)
*A01K 27/00* (2006.01)
*A01K 1/06* (2006.01)

(52) U.S. Cl.
CPC .......... *A01K 1/0272* (2013.01); *A01K 27/002* (2013.01); *A01K 1/0613* (2013.01)

(58) Field of Classification Search
CPC .......... A01K 1/04; A01K 1/06; A01K 1/0613; A01K 15/04
USPC ............................................ 119/771
See application file for complete search history.

(56) References Cited

U.S. PATENT DOCUMENTS

| | | | |
|---|---|---|---|
| 633,016 A * | 9/1899 | Little ...................... | A01K 1/04 119/784 |
| 4,252,084 A * | 2/1981 | Willow ................ | A01K 27/003 119/771 |
| 4,827,876 A * | 5/1989 | Krekelberg .............. | A01K 1/04 119/771 |
| 4,834,027 A | 5/1989 | Meyer | |
| 4,899,694 A | 2/1990 | Belluomini | |
| 4,947,801 A | 8/1990 | Glass | |
| 4,958,597 A | 9/1990 | Mildner | |
| D360,711 S | 7/1995 | O'Neill | |
| 5,483,925 A | 1/1996 | Childress | |
| 5,505,162 A | 4/1996 | Fleischer et al. | |
| 5,551,379 A * | 9/1996 | Hart ...................... | B60P 7/0823 119/797 |
| D379,688 S | 6/1997 | Werner | |
| 5,718,190 A | 2/1998 | Tinker | |
| 6,079,369 A * | 6/2000 | Hill ...................... | A01K 1/0272 119/771 |
| 6,260,513 B1 | 7/2001 | Younkin | |
| 6,374,776 B2 * | 4/2002 | Adair ..................... | B60R 22/10 119/771 |
| D569,050 S | 5/2008 | Spater et al. | |
| 7,806,089 B2 | 10/2010 | Walker-Lndyke et al. | |

(Continued)

OTHER PUBLICATIONS

Ebay; "New Red Nylon Dog Safety Restraint/Leash for small truck cargo bed"; printed from Internet Mar. 3, 2020, 5 pages.

*Primary Examiner* — Ebony E Evans
(74) *Attorney, Agent, or Firm* — Hall Estill Law Firm

(57) ABSTRACT

A pet containment apparatus for a truck bed that connects to the corner bed anchors and contains an overhead connection for the pet(s) to allow for free movement of the pet(s) in the truck bed, while keeping the pet(s) from exiting the truck bed. The apparatus may be static or adjustable and allow for single or multiple pets to travel safely in the truck bed. The pet(s) will be tethered overhead to allow for free movement. In preferred embodiments, the various elements of the apparatus include a sturdy, metallic frame with adjustable connectors to fit various truck beds.

20 Claims, 5 Drawing Sheets

(56) References Cited

U.S. PATENT DOCUMENTS

| | | | |
|---|---|---|---|
| 2003/0041811 A1* | 3/2003 | Russell | A01K 1/0263 |
| | | | 119/771 |
| 2003/0221635 A1* | 12/2003 | Fradette, II | A01K 1/04 |
| | | | 119/784 |
| 2007/0006819 A1 | 1/2007 | Gilbert-Brindley | |
| 2007/0175407 A1* | 8/2007 | Everhart | A01K 27/003 |
| | | | 119/792 |
| 2010/0050957 A1 | 3/2010 | Elkins et al. | |
| 2013/0145993 A1* | 6/2013 | Wherley | A01K 1/04 |
| | | | 119/787 |
| 2015/0173326 A1* | 6/2015 | Pittman | A01K 1/04 |
| | | | 119/780 |
| 2015/0342148 A1* | 12/2015 | Dixon | A01K 1/04 |
| | | | 119/771 |
| 2016/0338321 A1* | 11/2016 | Simons | A01K 15/04 |
| 2019/0061860 A1 | 2/2019 | Greiner et al. | |

\* cited by examiner

PET CONTAINMENT APPARATUS

FIELD OF THE INVENTION

The present disclosure relates generally to a pet containment apparatus, and more particularly, not by way of limitation, to an improved pet containment apparatus positioned in a vehicle.

BACKGROUND OF THE INVENTION

Many pet owners like to travel with their pets. More specifically, dog owners like to travel with their dogs in a truck bed or other vehicle. This can be unsafe and even illegal. Some dogs like to jump out of the truck bed, resulting in injury, getting lost, or even death. Some cities have banned dogs from riding in the beds of pickups unrestrained for such reasons.

Certain tethers have been developed to tie the pet from the collar or harness of the front of the truck bed which restricts the pet's mobility. Other methods restrain a pet by placing a kennel in the truck bed which restrict the mobility of the pet and causes the pet owner to have to tie down the kennel so that it does not slide around while the truck is moving.

To this end, a need exists for an improved pet containment apparatus that allows pets to safely travel in a truck bed so as to freely move about while being restrained from exiting the truck bed. It is to such an apparatus that the present disclosure is directed.

BRIEF DESCRIPTION OF THE DRAWING(S)

DETAILED DESCRIPTION

Figure 1:
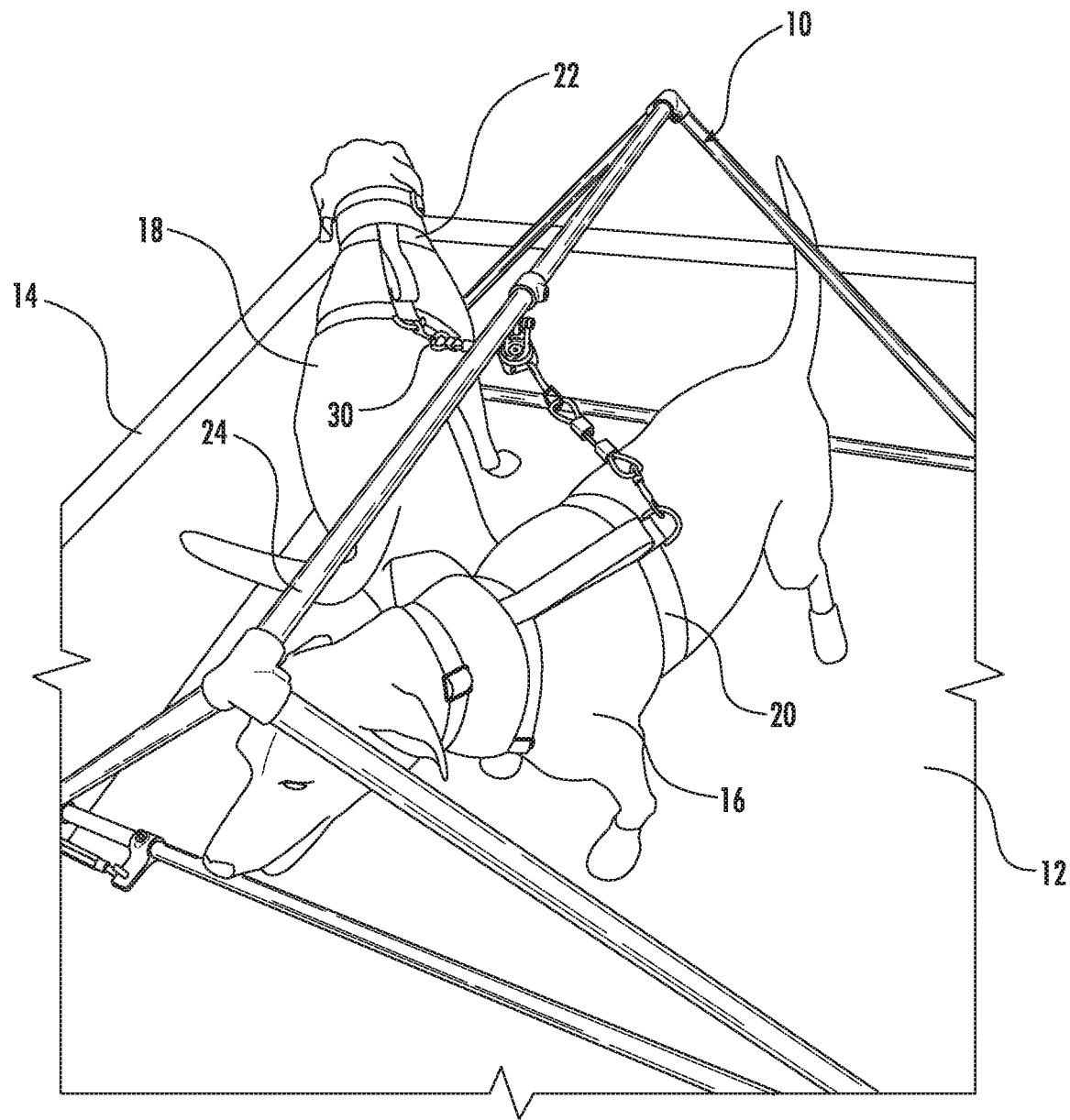
FIG. 1 is a perspective view of one embodiment of a pet containment apparatus constructed in accordance with the present disclosure positioned in a bed of a pickup truck.

Before explaining at least one embodiment of the inventive concept disclosed herein in detail, it is to be understood that the inventive concept is not limited in its application to the details of construction, experiments, exemplary data, and/or the arrangement of the components set forth in the following description, or illustrated in the drawings. The presently disclosed and claimed inventive concept is capable of other embodiments or of being practiced or carried out in various ways. Also, it is to be understood that the phraseology and terminology employed herein is for purpose of description only and should not be regarded as limiting in any way.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one, or at least one, and the singular also includes the plural, unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

New pet containment apparatuses, devices, and methods for safely allowing pets to move freely while traveling in a pickup truck bed are discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

Referring now to the drawings, and more particularly to FIG. 1, shown therein is an exemplary embodiment of a pet containment apparatus 10 constructed in accordance with the inventive concepts disclosed herein. The pet containment apparatus 10 is shown mounted in a cargo bed 12 of a truck 14 so as to be used with transporting dogs 16 and 18 wherein each dog 16 and 18 is provided with a harness 20 and 22, respectively. It should be understood by one of ordinary skill in the art that the pet containment apparatus 10 may be used with any number of dogs or other pets, as will be described in further detail herein. In addition, it should be understood that the pet containment apparatus 10 is not limited to use with a vehicle and, in other embodiments, may be used to secure dogs in a yard or in other structures, such as a garage, a porch and the like.

It is contemplated that the pet containment apparatus 10 is constructed from various components and various materials, however, it should be understood that the pet containment apparatus 10 may be constructed from a single component or material. The pet containment apparatus 10 is preferably made of a durable and rigid material which is strong enough to prevent movement and bending of the pet containment apparatus 10. Suitable materials for construction of all or part of the pet containment apparatus 10 and components thereof include polymeric materials, plastics, metals such as aluminum, steel, titanium, magnesium or alloys containing these metals, and composite materials, wood, rubber, foam, iron, and the like which are capable of providing the desired strength and durability for the pet containment apparatus 10. Further, it should be understood that various methods known in the art may be utilized for constructing and manufacturing the various embodiments of the pet containment apparatus 10 as described and shown herein.

Referring now to FIGS. 1-4, broadly, the pet containment apparatus 10 includes a frame assembly 24, a swivel assembly 26, a first tether assembly 28 and a second tether assembly 30.

The frame assembly 24 (FIG. 3) includes a first attachment assembly 32, a second attachment assembly 34 and a top pole 36 extending therebetween for connecting the first attachment assembly 32 and the second attachment assembly 34 to one another. The frame assembly 24 is configured so that the top pole 36 is positioned in the truck bed 12 above the dogs' heads. The top pole 36 is a fixed length or an adjustable length so as to fit various-sized cargo areas in various-sized vehicles. In one embodiment, the top pole 36 is a solid, single piece of material of a fixed length, or multiple components constructed to a fixed length. In another embodiment, the top pole 36 is a single, telescoping piece of material, or multiple components allowing for adjustment of the top pole 36 to various lengths.

The first attachment assembly 32 and the second attachment assembly 34 are constructed similar to one another. The first attachment assembly 32 is provided with an offset flange 38a connected to one end of a bottom pole 40a with a set screw 42a and an offset flange 44a connected to another end of the bottom pole 40a with a set screw 45a so as to attach the first attachment assembly 32 to anchors 46 and 48 provided on corners of the truck bed 12. On one end of the first attachment assembly 32, an S-hook 50a is utilized to attach the offset flange 38a to the anchor 46. On the opposite end of the first attachment assembly 32, a turnbuckle 52a is utilized to attach the offset flange 44a to the anchor 48 to cinch up the bottom pole 40a.

To raise the connection above the dogs' heads, a swivel socket 54a is attached to one end of the bottom pole 40a with a set screw 55a. The swivel socket 54a accepts a side pole 56a and tightens with a set screw 58a. A swivel socket 60a is attached to an opposite end of the bottom pole 40a with a set screw 62a. The swivel socket 60a accepts a side pole 64a and tightens with a set screw 66a. The two side poles 56a and 64a are attached to a side outlet elbow 68a and connected with set screw 69a and 70a, respectively.

The second attachment assembly 34 is provided with an offset flange 38b connected to one end of a bottom pole 40b with a set screw 42b and an offset flange 44b connected to another end of the bottom pole 40b with a set screw 45b so as to attach the second attachment assembly 34 to anchors 72 and 74 provided on corners of the truck bed 12. On one end of the second attachment assembly 34, an S-hook 50b is utilized to attach the offset flange 38b to the anchor 72. On the opposite end of the second attachment assembly 34, a turnbuckle 52b is utilized to attach the offset flange 44b to the anchor 74 to cinch up the bottom pole 40b.

To raise the connection above the dogs' heads, a swivel socket 54b is attached to one end of the bottom pole 40b with a set screw 55b. The swivel socket 54b accepts a side pole 56b and tightens with a set screw 58b. A swivel socket 60b is attached to an opposite end of the bottom pole 40b with a set screw 62b. The swivel socket 60b accepts a side pole 64b and tightens with a set screw 66b. The two side poles 56b and 64b are attached to a side outlet elbow 68b and connected with set screw 69b and 70b, respectively.

The poles 36, 40a and 40b, 56a and 56b, and 64a and 64b are preferably expandable with a locking mechanism or of assorted lengths. The flanges, sockets and elbows (connectors) can be fabricated on the poles or can be separate from the poles. The poles and connectors may be made of steel, iron, aluminum, plastics, or other similar or suitable materials which will be sturdy enough maintain proper securing and safety for the pets.

Figure 4:
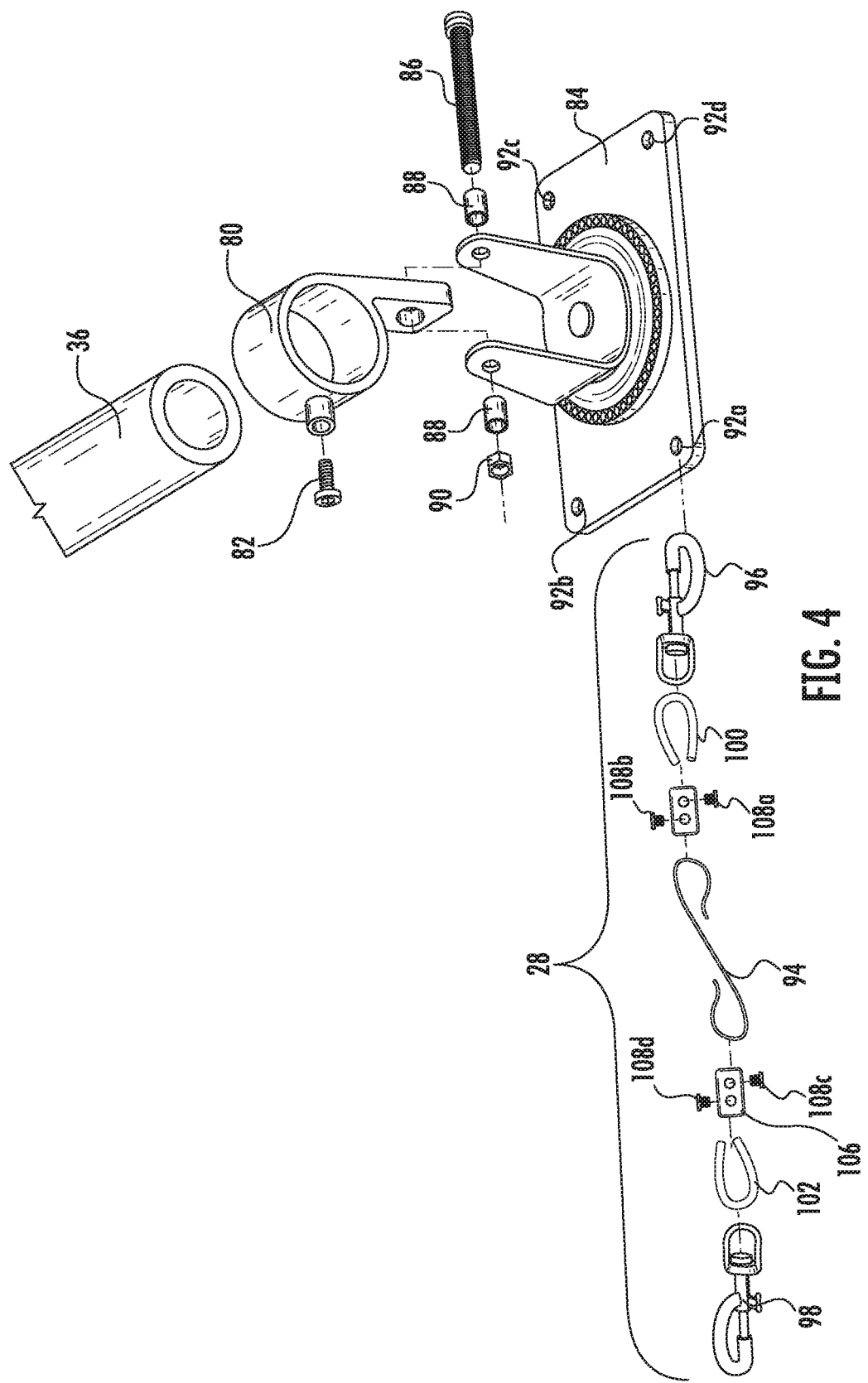
FIG. 4 is an exploded perspective view of a swivel assembly and tether assembly of the pet containment apparatus of FIG. 1.

Referring now to FIG. 4, the swivel assembly 26 includes an offset flange 80 positioned over the top pole 36 and connected with a set screw 82. A swivel plate 84 or connector is connected to the offset flange 80 with a screw 86, spacers 88, and a lock nut 90. The swivel plate 84 is provided with greased bearings in between the plates so as to freely spin. Holes 92a-92d are provided on corners of the swivel plate 84 for connection of at least one pet tether assembly 28 and/or 30. The spacers 88 may be made of nylon or any other similar or suitable material to keep a tight connection between all the parts.

Figure 2:
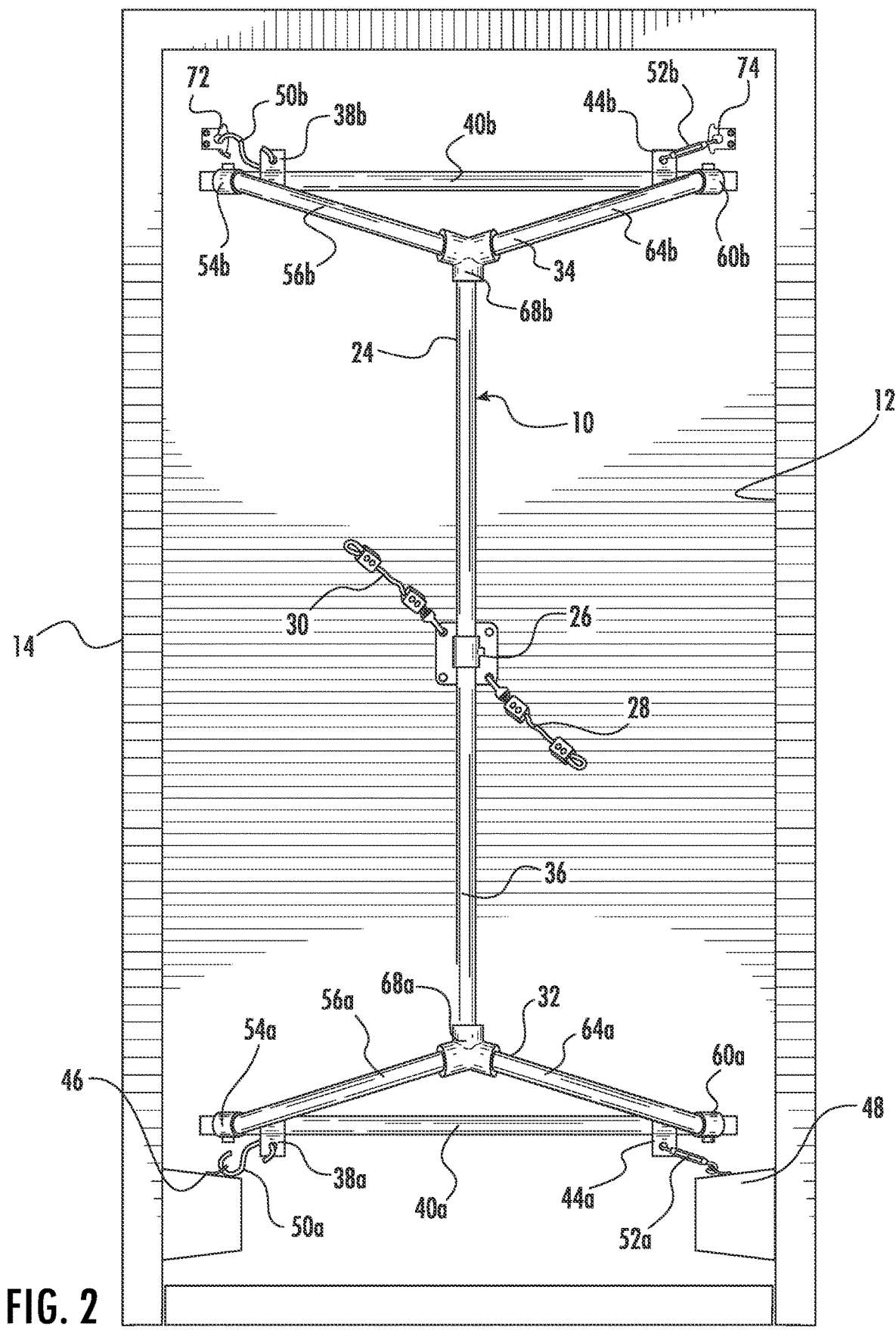
FIG. 2 is a top perspective view of the pet containment apparatus of FIG. 1.
Figure 3:
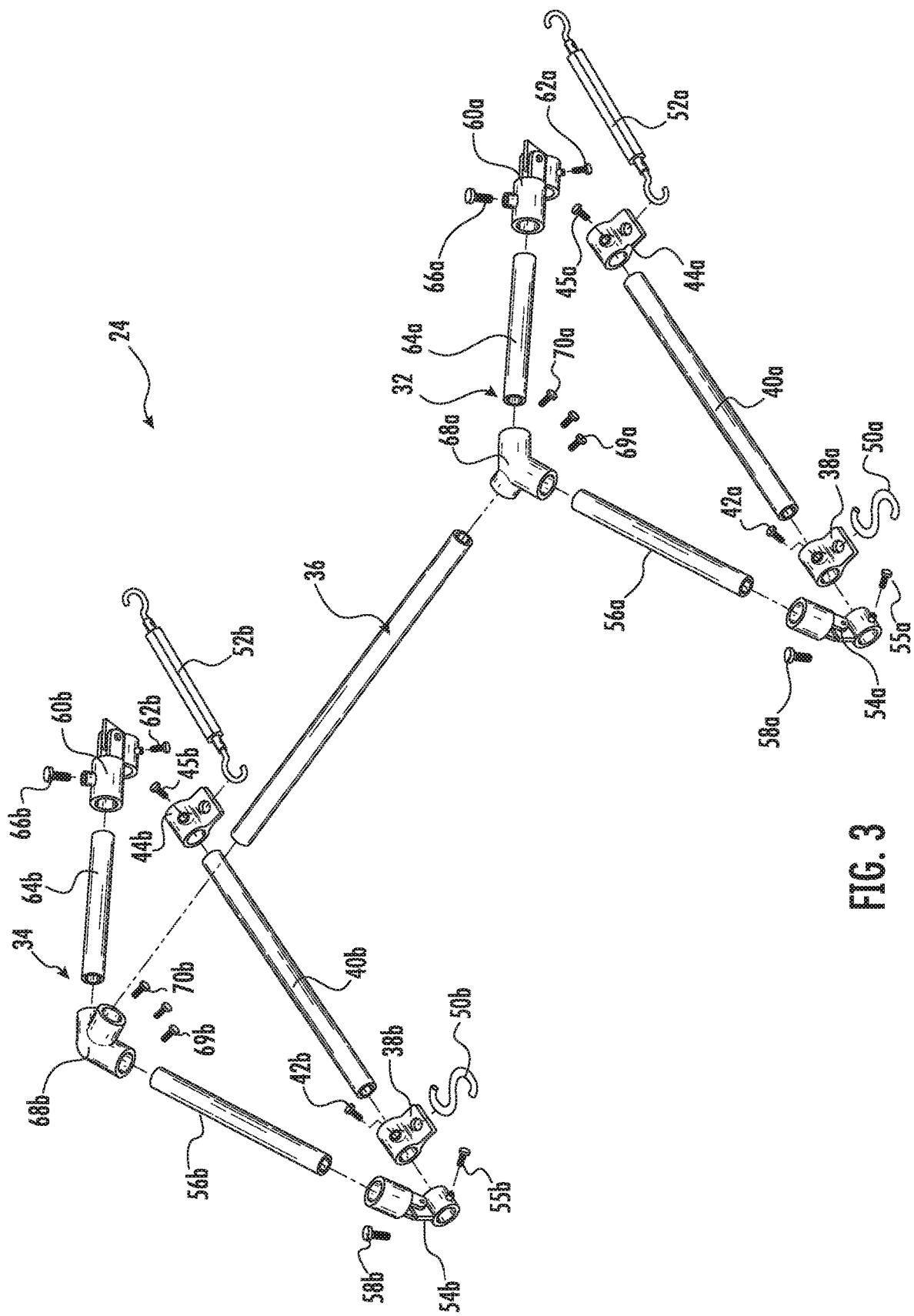
FIG. 3 is an exploded perspective view of a frame assembly of the pet containment apparatus of FIG. 1.

Referring to FIGS. 1, 2 and 4, the first tether assembly 28 and the second tether assembly 30 are identical to one another in structure and function. For the sake of brevity, only the first tether assembly 28 will be described herein. The first tether assembly 28 includes a cable 94 with swivel bolt snaps 96 and 98 attached through thimbles 100 and 102 and secured with clamps 104 and 106, respectively, each having two screws 108a and 108b and 108c and 108d, respectively, on opposite ends of the cable 94. The swivel bolt snap 96 is attached to the swivel plate 84 through the hole 92a and the swivel bolt snap 98 is connected to the harness 20 of the dog 16.

Figure 5:
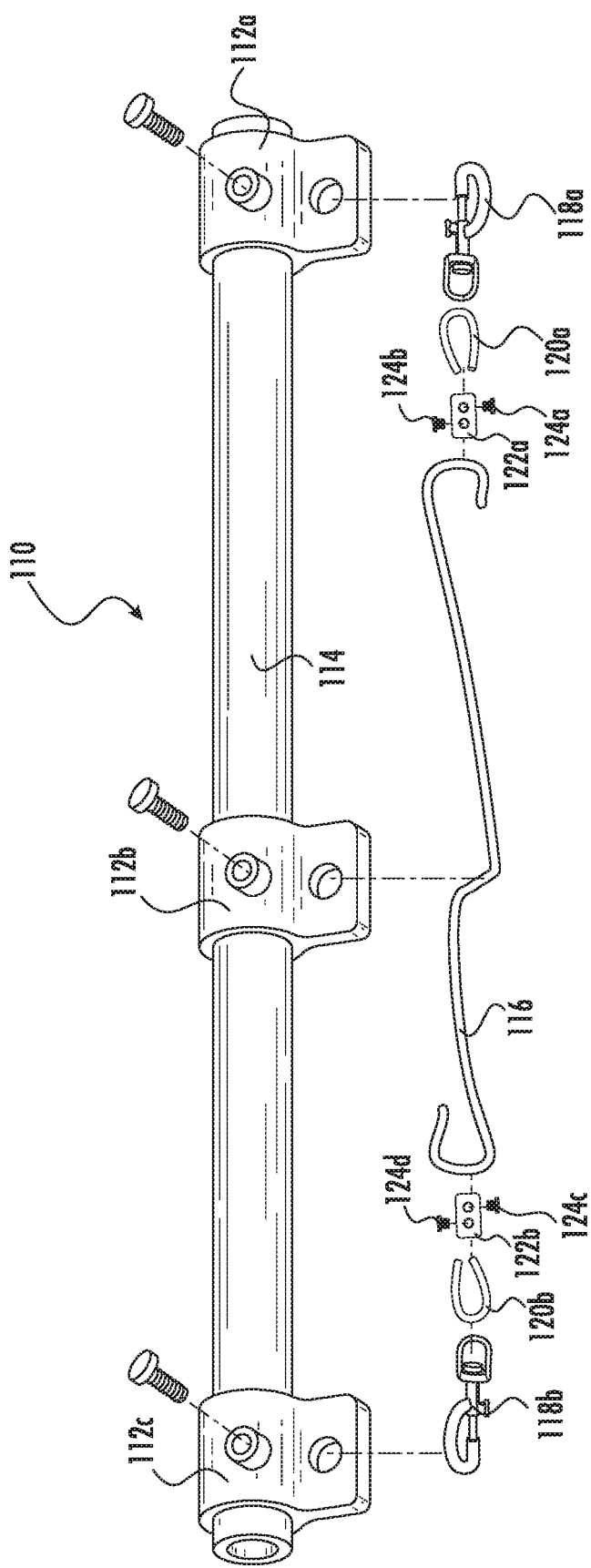
FIG. 5 is an exploded perspective view of another embodiment of a pet containment apparatus.

Referring now to FIG. 5, another embodiment of a pet containment apparatus 110 is shown constructed in accordance with the present disclosure. The pet containment apparatus 110 is similar to the pet containment apparatus 10 except as described herein. The pet containment apparatus 110 is configured to be utilized with a single pet. The pet containment apparatus 110 includes three offset flanges 112a, 112b and 112c wherein one flange is positioned on one end of a top pole 114 (similar to the top pole 36 of the pet containment apparatus 10), one flange is positioned in the middle of the top pole 114, and one flange is positioned on another end of the top pole 114. A cable 116 is strung between the three holes of the offset flanges. In preferred embodiments, on each end of the cable 116, swivel bolt snaps 118a and 118b are pulled through the opening of the thimbles 120a and 120b, respectively, and the cable 116 are run around the thimbles 120a and 120b, respectively, and clamps 122a and 122b, respectively, hold it in place by tightening two screws 124a and 124b and 124c and 124d, respectively. This iteration allows for adjustment of the cable 116 based on the offset flange (112a, 112b and 112c) placement. The cable 116 is made of a coated, braided, galvanized wire or another similar or suitable material that allows for a smooth track for the swivel bolt snap and a smooth material that will not injure the pets.

As described herein, the present disclosure allows for a single, or multiple pets to ride safely in the bed of a pickup truck. The pet containment apparatus is adjustable to allow for different lengths and widths of truck beds. For a single pet, there is a tether that connects to its harness then attaches to the cable run between two adjustable connections attached to the top pipe. For multiple pets, the tethers will attach to each of their harnesses, then to a swivel attachment mounted to the center adjustable attachment to allow for them to walk freely without get tangled with each other. The short tethers allow for the pets to walk around the inside of the truck bed, sit, and lay down, but they are short enough that the pet cannot jump out of the bed.

The pet containment apparatus for a truck bed is a static or adjustable system that allows for the safe transport for a pet riding in the back of a pickup truck, while allowing for the free movement of the pet(s) during travel, but will not allow for the pet(s) to exit the truck bed comprising: a sturdy, static or adjustable frame, comprised of metallic, plastic, wood, or other suitable material, that connects to each of the corner anchors in a truck bed by a solid or adjustable connection; an overhead cable, swivel, or other connection that attaches to the frame of the apparatus and allows for the attachment of one or more tethers or leashes; two connectors on the tether or leash that connect to the harness of the pet on one end and the overhead connection on the other.

It should be understood that changes may be made in the operation and setup of the various embodiments.

From the above description, it is clear that the inventive concept(s) disclosed herein is well-adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A pet containment apparatus for being mounted in a truck bed, comprising:
    a frame assembly, comprising:
        a top support having a first end and a second end;
        a first side assembly having a first pair of angled support members connected to the first end of the top support and a first base member connected to each of the first pair of angled support members, the first base member for being connected to the truck bed; and
        a second side assembly having a second pair of angled support members connected to the second end of the top support and a second base member connected to each of the second pair of angled support members, the second base member for being connected to the truck bed, wherein each of the first side assembly and the second side assembly are arranged in a substantially angled triangular shaped configuration so as to support the top support a distance above the truck bed to be positioned over the head of at least one pet placed in the truck bed;
    an overhead connector connected to between the first end and the second end of the top support of the frame assembly; and
    at least one tether having a first end and a second end such that the first end is connected to the overhead connector and the second end is connectable to the at least one pet such that the tether is a sufficient length allowing for the at least one pet to move about the truck bed and so as to prevent the at least one pet from leaving the truck bed while the truck is moving.

2. The pet containment apparatus of claim 1 wherein the first side assembly is connectable to a first and second anchor provided on one side of the truck bed and the second side assembly is connectable to a third and fourth anchor provided on the opposite side of the truck bed.

3. The pet containment apparatus of claim 2 wherein the first side assembly is connectable to the first anchor with an S hook and the second anchor with a turnbuckle and the second side assembly is connectable to the third anchor with an S hook and the fourth anchor with a turnbuckle.

4. The pet containment apparatus of claim 1 wherein the top pole is a fixed length.

5. The pet containment apparatus of claim 1 wherein the top pole is adjustable to various lengths.

6. The pet containment apparatus of claim 1 wherein the overhead connector is a swivel plate.

7. The pet containment apparatus of claim 1 wherein the at least one tether is connectable to a harness attached to the at least one pet.

8. A pet containment apparatus, comprising:
    a frame assembly mounted in a cargo area of a vehicle the frame assembly comprises:
        a first attachment assembly connected to one side of the cargo area of the vehicle;
        a second attachment assembly connected to the opposite side of the cargo area of the vehicle; and
        a top pole extending therebetween for connecting the first attachment assembly and the second attachment assembly to one another wherein each of the first attachment assembly and the second attachment assembly are arranged in a substantially angled triangular shaped configuration so as to support the top support a distance above the cargo area of the vehicle to be positioned over the head of a plurality of pets placed in the cargo area of the vehicle;
    an overhead connector connected to the top pole of the frame assembly wherein the overhead connector is provided with a swivel plate having a plurality of holes; and
    a plurality of tethers, each of the plurality of tethers having a first end and a second end such that the first end of each tether of the plurality of tethers is connected to a hole of the plurality of holes of the swivel plate of the overhead connector and the second end of each tether is connectable to at least one of the plurality of pets such that the tether is a length allowing for the at least one of the plurality of pets to move about the cargo area of the vehicle and so as to prevent the at least one of the plurality of pets from leaving the cargo area of the vehicle.

9. The pet containment apparatus of claim 8 wherein the first attachment assembly is connectable to a first and second anchor provided on one side of the cargo area of the vehicle and the second attachment assembly is connectable to a third and fourth anchor provided on the opposite side of the cargo area of the vehicle.

10. The pet containment apparatus of claim 9 wherein the first attachment assembly is connectable to the first anchor with an S hook and the second anchor with a turnbuckle and the second attachment assembly is connectable to the third anchor with an S hook and the fourth anchor with a turnbuckle.

11. The pet containment apparatus of claim 8 wherein the first attachment assembly is provided with a first bottom pole having a swivel connector connected to each end of the first bottom pole, one swivel connector configured to receive a first side pole on one end of the first bottom pole and the other swivel connector configured to receive a second side pole on the other end of the first bottom pole and wherein the second attachment assembly is provided with a second bottom pole having a swivel connector connected to each end of the second bottom pole, one swivel connector configured to receive a third side pole on one end of the second bottom pole and the other swivel connector configured to receive a fourth side pole on the other end of the second bottom pole so that the first attachment assembly and the second attachment assembly are connected with the top pole so as to cooperate to position the top pole above the head of the at least one of the plurality of pets positioned in the cargo area of the vehicle.

12. The pet containment apparatus of claim 8 wherein the top pole is a fixed length.

13. The pet containment apparatus of claim 8 wherein the top pole is adjustable to various lengths.

14. The pet containment apparatus of claim 8 wherein each of the plurality of tethers is connectable to a harness attached to at least one of the plurality of pets.

15. A method for mounting a pet containment apparatus to a truck bed, comprising the steps of:
mounting a first base member having a first end and a second end to the truck bed;
mounting a second base member having a first end and a second end to the truck bed;
connecting a first angled support member to the first end of the first base member;
connecting a second angled support member to the second end of the first member wherein the first angled support member and the second angled support member are arranged in a substantially angled triangular shaped configuration;
connecting a third angled support member to the first end of the second base member;
connecting a fourth angled support member to the second end of the second base member wherein the third angled support member and the fourth angled support member are arranged in a substantially angled triangular shaped configuration;
connecting the first angled support member and the second angled support member to a first end of a top support;
connecting the third angled support member and the fourth angled support member to a second end of the top support so that the four angled support members cooperate to support the top support a distance above the truck bed to be positioned over the head of at least one pet placed in the truck bed;
connecting an overhead connector between the first end and the second end of the top support;
attaching at least one tether having a first end and a second end such that the first end is connected to the overhead connector; and
attaching the second end of the tether to the at least one pet such that the tether is a sufficient length allowing for the at least one pet to move about the truck bed and so as to prevent the at least one pet from leaving the truck bed while the truck is moving.

16. The method of claim 15 wherein a first side assembly is connectable to a first and second anchor provided on one side of the truck bed and a second side assembly is connectable to a third and fourth anchor provided on the opposite side of the truck bed.

17. The method of claim 16 wherein the first base member is connectable to the first anchor with an S hook and the second anchor with a turnbuckle and the second side assembly is connectable to the third anchor with an S hook and the fourth anchor with a turnbuckle.

18. The method of claim 15 wherein a top pole is a fixed length.

19. The method of claim 15 wherein a top pole is adjustable to various lengths.

20. The method of claim 15 wherein the at least one tether is connectable to a harness attached to the at least one pet.

* * * * *